United States Patent
Marum et al.

(10) Patent No.: US 9,881,063 B2
(45) Date of Patent: Jan. 30, 2018

(54) SYSTEMS AND METHODS FOR USING GRAPHICAL REPRESENTATIONS TO MANAGE QUERY RESULTS

(75) Inventors: Matthew Gordon Marum, Cary, NC (US); Samuel George Padgett, Raleigh, NC (US); Steven Keith Speicher, Holly Springs, NC (US); Michael John Tabb, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 13/159,682

(22) Filed: Jun. 14, 2011

(65) Prior Publication Data

US 2012/0323887 A1    Dec. 20, 2012

(51) Int. Cl.
*G06F 17/30* (2006.01)

(52) U.S. Cl.
CPC .............. *G06F 17/30554* (2013.01)

(58) Field of Classification Search
CPC ................................. G06F 17/30554
USPC .......................................... 707/722
See application file for complete search history.

(56) References Cited

U.S. PATENT DOCUMENTS

| | | | |
|---|---|---|---|
| 5,657,437 A | 8/1997 | Bishop et al. | |
| 5,884,306 A * | 3/1999 | Bliss | G06F 3/0481 |
| 6,147,687 A | 11/2000 | Wanderski | |
| 6,317,739 B1 * | 11/2001 | Hirata et al. | |
| 7,216,116 B1 | 5/2007 | Nilsson et al. | |
| 7,860,831 B2 | 12/2010 | Federighi et al. | |
| 8,548,967 B1 * | 10/2013 | Poole | G06F 17/30392 |
| | | | 707/705 |
| 2004/0093559 A1 | 5/2004 | Amaru et al. | |
| 2005/0138564 A1 | 6/2005 | Fogg | |
| 2005/0246352 A1 | 11/2005 | Moore et al. | |

(Continued)

FOREIGN PATENT DOCUMENTS

| | | |
|---|---|---|
| CN | 1904897 A | 1/2007 |
| WO | 2008086266 A2 | 7/2008 |

OTHER PUBLICATIONS

Non-Final Office Action in related U.S. Appl. No. 13/420,919, dated Aug. 14, 2012; 11 pages.

(Continued)

*Primary Examiner* — Jorge A Casanova
(74) *Attorney, Agent, or Firm* — Schmeiser, Olsen & Watts LLP

(57) ABSTRACT

Described are systems and methods for changing query result data graphically displayed on an electronic device. A query of a data repository is performed. A graphical representation of a set of query results identified from the query is displayed. The set of query results includes a plurality of query result records. The graphical representation includes a first node corresponding to a first record field value and a second node corresponding to a second record field value. A region proximal to the first node displays at least one query result record having the first record field value. A query result record of the at least one query result record having the first record field value is selected. A field value of a selected query result record is changed from the first record field value to the second record field value by transitioning the selected query result record to a region proximal to the second node of the graphical representation.

13 Claims, 10 Drawing Sheets

(56) References Cited

U.S. PATENT DOCUMENTS

| | | |
|---|---|---|
| 2006/0004721 A1* | 1/2006 | Bedworth et al. ............... 707/3 |
| 2006/0235860 A1 | 10/2006 | Brewer et al. |
| 2007/0027855 A1* | 2/2007 | Kagawa ........................... 707/3 |
| 2007/0074130 A1* | 3/2007 | Folting et al. ............... 715/792 |
| 2007/0271285 A1 | 11/2007 | Eichorn et al. |
| 2008/0059899 A1* | 3/2008 | Gemmell et al. ............ 715/767 |
| 2008/0104529 A1 | 5/2008 | Cravens et al. |
| 2010/0161643 A1 | 6/2010 | Gionis et al. |
| 2010/0241951 A1 | 9/2010 | Vandervort et al. |

OTHER PUBLICATIONS

Final Office Action in related U.S. Appl. No. 13/420,919, dated Feb. 28, 2013; 10 pages.
Examination Report in related European patent application No. GB1206499.4, dated Mar. 27, 2013; 4 pages.
Non-Final Office Action in related U.S. Appl. No. 13/420,919, dated Feb. 10, 2014; 12 pages.
Non-Final Office Action in related U.S. Appl. No. 13/420,919, dated Dec. 24, 2014; 28 pages.
Non-Final Office Action in related U.S. Appl. No. 13/420,919, dated Mar. 20, 2017; 22 pages.
Final Office Action in U.S. Appl. No. 13/420,919, dated Jul. 6, 2017; 22 pages.

* cited by examiner

FIG. 5

SYSTEMS AND METHODS FOR USING GRAPHICAL REPRESENTATIONS TO MANAGE QUERY RESULTS

FIELD OF THE INVENTION

The present invention relates generally to the use of database query results, and more specifically, to systems and methods for changing contents of a query result set displayed according to a graphical representation.

BACKGROUND

Data retrieval tools are widely available for querying a database and displaying the query results in a grid or table to a computer user. The grid or table is generally organized into rows and columns. Query result values can be displayed at data fields arranged as cells formed by the rows and columns. A user can define selection criteria and/or customize the query results by column sorting, filtering based on field values, and the like, in order for the query results to be displayed at a useful manner to the user.

Data visualization techniques can be applied when a user selects one or more rows of a database table, whereby the selected items can be displayed as a histogram, bar graph, and the like. Once the graph is displayed according to a conventional approach, the underlying contents cannot be changed.

BRIEF SUMMARY

An embodiment features a method for changing query result data graphically displayed on an electronic device. In accordance with the method, a query of a data repository is performed. A graphical representation of a set of query results identified from the query is displayed. The set of query results includes a plurality of query result records. The graphical representation includes a first location corresponding to a first record field value and a second location corresponding to a second record field value. At least one query result record having the first record field value is displayed at the first location. A query result record of the at least one query result record having the first record field value is selected. A field value of a selected query result record is changed from the first record field value to the second record field value by transitioning the selected query result record to a region proximal to the second location of the graphical representation.

Another embodiment features a method for changing query result data graphically displayed on an electronic device. In accordance with the method, a query of a data repository is performed. A graphical representation of a set of query results identified from the query is displayed. The set of query results includes a plurality of query result records. The graphical representation includes a first node corresponding to a first record field value. A region proximal to the first node displays at least one query result record having the first record field value. A region proximal to the second node displays a modifiable field. A second record field value is entered into the modifiable field. The second node corresponds to the second record field value. A query result record of the at least one query result record having the first record field value is selected. A field value of a selected query result record is changed from the first record field value to the second record field value by transitioning the selected query result record to a region proximal to the second node displaying the modifiable field.

Another embodiment features a method for modifying data retrieved from a database query. In accordance with the method, a result set is determined from a database query. The result set includes a plurality of database records comprising a first database record and a second database record. A graphical representation of a data relationship between the first database record and the second database record is displayed. The graphical representation includes a plurality of vertices and at least one arc extending between the vertices. The first database record and the second database record is displayed at a region proximal to at least one of the vertices. A graphical representation of a plurality of record field values is displayed. Each record field value corresponds to a vertex. At least one of the first and second database records is selected. A displayed record field value is selected. The selected at least one of the first and second database records is changed to include the selected displayed record field value.

Another embodiment features a computer program product for displaying a contact list. The computer program product comprises a computer readable storage medium having computer readable program code embodied therewith. The computer readable program code comprises computer readable program code configured to performing a query of a data repository. The computer readable program code further comprises computer readable program code configured to display a graphical representation of a set of query results identified from the query. The set of query results includes a plurality of query result records, the graphical representation including a first node corresponding to a first record field value and a second node corresponding to a second record field value. The computer readable program code further comprises computer readable program code configured to display at a region proximal to the first node at least one query result record having the first record field value. The computer readable program code further comprises computer readable program code configured to select a query result record of the at least one query result record having the first record field value. The computer readable program code further comprises computer readable program code configured to change a field value of a selected query result record from the first record field value to the second record field value by transitioning the selected query result record to a region proximal to the second node of the graphical representation.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 5 is a screenshot of a query result set displayed at a database file, in accordance with an embodiment;

DETAILED DESCRIPTION

Figure 1:
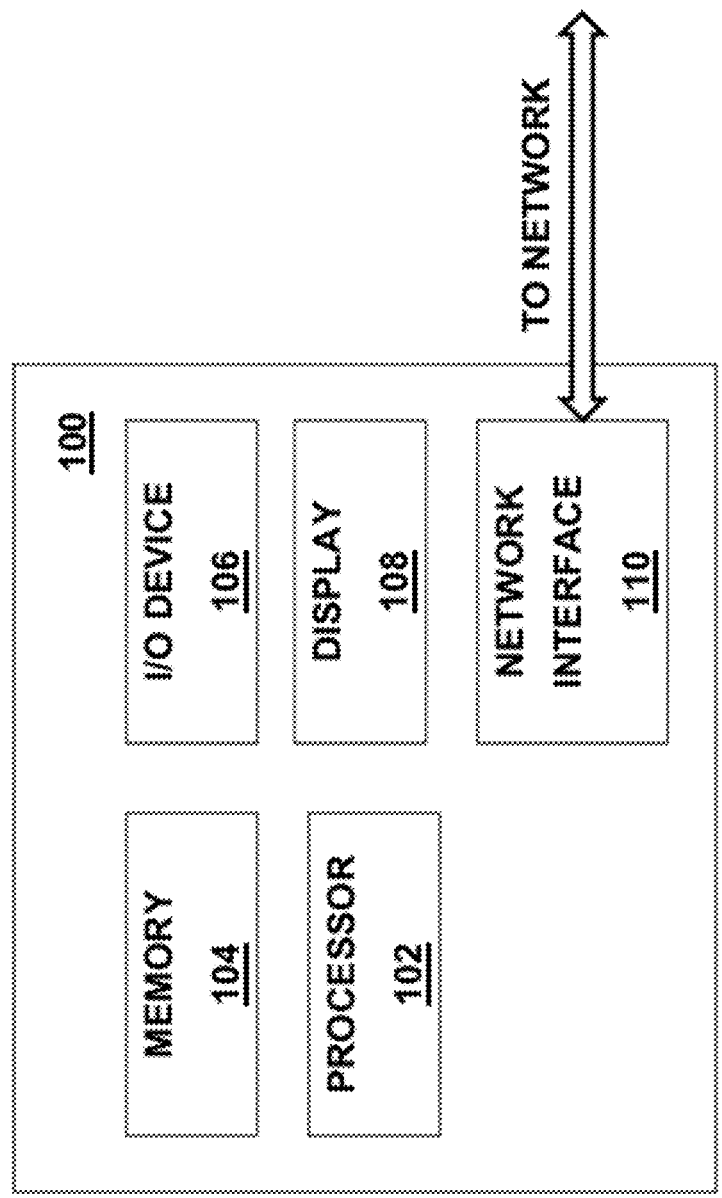
FIG. 1 is a block diagram of a graphical display system in which embodiments of the present inventive concepts can be implemented.

In the following description, specific details are set forth although it should be appreciated by one of ordinary skill that the systems and methods can be practiced without at least some of the details. In some instances, known features or processes are not described in detail so as not to obscure the present invention.

The embodiments described herein provide for a presentation of data that allows users to make straightforward and natural changes to query result records without relying on conventional hard-to-discover context menu options, query modifications, or separate dialogs. The embodiments overcome limitations regarding conventional approaches for temporarily viewing different visual representations of a query result set for the purpose of making edits to its contents. One such approach is for a user to view a form in a display window that represents a single detailed record corresponding to a result row of a database table. Another approach is for a user to modify query criteria to change the display of the query results, or perform column sorting or related adjustments, for example, to rearrange a tabular representation of the data.

The embodiments referred to herein also overcome limitations regarding conventional approaches when users desire to make multiple changes to the query results quickly or to perform an action on multiple records at once. One approach is for a user to select multiple rows of a query results table, and modify the selection by using a context menu to invoke a batch update. For example, a drag-and-drop operation can be performed where the selected records are moved to a dialog box configured with a field value, whereby the selected records can each be changed to that field value. However, batch updates are generally made without a clear understanding of the relationship of the selected items with respect to the other elements of the result set. The batch update operation is also oriented to a subset of data in the result set, for example, a single field value common to a handful of records. Batch update dialog boxes and/or context menu options often display field values for certain records but do not display other records in the result set that share those values.

Another conventional approach is that users can select multiple records of a result set at the same time, and rearrange the result set accordingly by column sorting or modifying an existing query to allow for an easier selection of the rows that they want to change. When changes are made to the result set in this manner, problems can arise if the modified rows are re-inserted in sorted order they will disappear from view and that by leaving the modified rows in place is an indication of the result set no longer properly being sorted.

In brief overview, the present inventive concepts include systems and methods for visually presenting a query result set in accordance with one or more different graphical representations on a display, and permitting a user to modify underlying field values of the query result set when navigating between different the representations. During an operation, a user can run a database query. A field graph or other graphical representation of the query results can be displayed. The records of the query results can be positioned about vertices, also referred to as nodes, and organized according to the contents of the query result set. For example, one or more records of the query result set can be positioned about a particular vertex when a field value of the record is the same as a value corresponding to the vertex. The displayed field graph can also include directed edges, or arcs, extending between the vertices to indicate possible transition paths for the records.

A field value of one or more records can be changed by moving a record positioned about a first vertex to a second vertex representing a different field value. For example, a user can perform a drag-and-drop operation to transition the selected record from the first vertex to the second vertex, or by highlighting an arc extending between the first vertex and the second vertex. In this manner, an original field value can be removed from a record when the record is moved from the first vertex to a different vertex, referred to as a second vertex. Accordingly, the record is changed to include the field value corresponding to the second vertex. A consistent view of the graphical representation of the query results can therefore be maintained regardless of changes made to the records.

A user can also change between different visual representations to obtain different views of the query results. For example, a user can select a different field type from a tab on a graphical user interface (GUI), thereby displaying a different field graph for the same query results. Here, the user can change one or more field values under the newly selected field type by performing a drag-and-drop operation or highlighting an arc in a similar manner as described above.

In another embodiment, at least one freeform vertex is provided that displays a dialog box, pop-up, and the like for entering new field values, or presenting one or more other field values of the query result set. Query result records can be modified to include the new field values by positioning the records in a region proximal to the freeform vertex, or by highlighting an arc extending between the record and the freeform vertex, or by other approaches described herein.

Also, multiple field types can be simultaneously selected and represented by forming a product of field values under the field types. For example, multiple columns of a database table, each corresponding to a field type, can be selected, whereby a field graph can include vertices that each can display multiple field values, instead of a single field value. If a record has field values that match the field values identified with the vertex, then the record is positioned in a region proximal to that vertex. The record can be transitioned to another vertex having multiple fields, whereby the record is updated with the fields of the other vertex, similar to that described herein with respect to other embodiments.

FIG. 1 is a block diagram of a computer system 100 in which embodiments of the present inventive concepts can be implemented. The computer system 100 can be a personal computer, server, smartphone, or any other electronic device known to those of ordinary skill in the art.

The computer system 100 includes at least one processor 102, for example, a CPU, a memory 104, and a display 108. The memory 104 can be volatile, for example, RAM, or non-volatile, for example, ROM, flash memory, and the like, or a combination thereof. The memory 104 can include removable and/or non-removable storage media implemented in accordance with methods and technologies known to those of ordinary skill in the art for storing data. Stored in the memory 104 can include program code, such as program code corresponding to an operating system, graphical user interface, and systems and methods in accordance with the present inventive concepts described herein.

The computer system 100 can include a user interface in communication with one or more I/O devices 106, such as a keyboard, a mouse, a trackball, and/or a touchscreen. An I/O device 106 can include an interface for communicating with a display 108, which can present one or more visual representations of query result data to a user in accordance with the present inventive concepts. The computer system 100 can also include a network interface 110 that allows the computer system 100 to communicate with other devices via a network (not shown) such as a WAN, a LAN, the Internet, and the like, or a direct connection. The computer system 100 can include additional hardware and/or software components known to those of ordinary skill in the art, for example, one or more connectors such as a USB connector for coupling to other electronic devices such as a flash memory stick.

The processor 102, memory 104, the I/O device 106, the display 108, and the network interface 110 can communicate with each other over one or more communications busses known to those of ordinary skill in the art, for example, a Peripheral Component Interconnect (PCI) bus.

Figure 2:
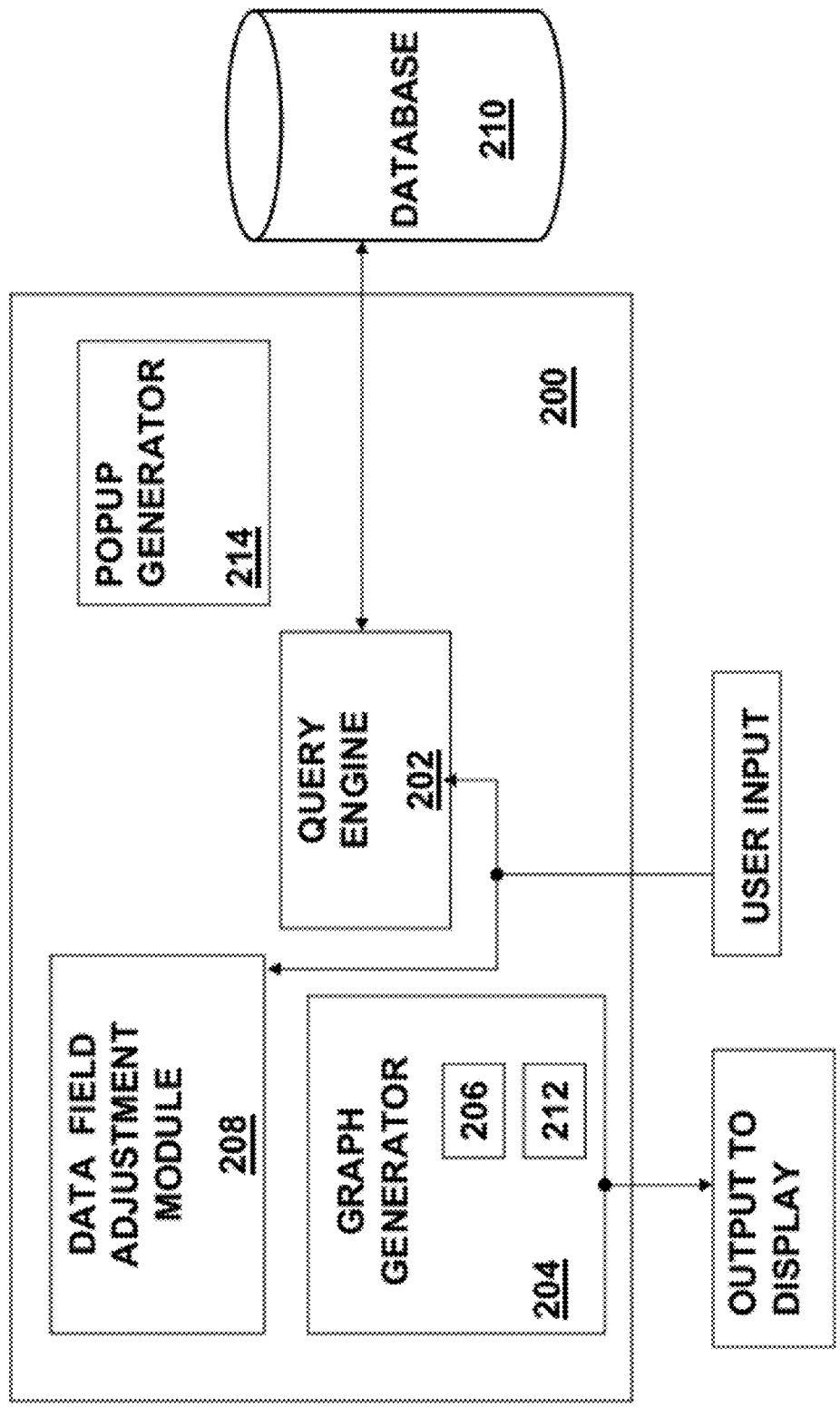
FIG. 2 is a block diagram of a query result management system, in accordance with an embodiment.

FIG. 2 is a block diagram of a query result management system 200, in accordance with an embodiment. The query result management system 200 can execute on a computer system, for example, the computer system 100 described in FIG. 1. The query result management system 200 can be configured to operate with a graphical user interface. Elements of the query result management system 200 can be installed in different memory devices of one or more computer systems. Elements of the query result management system 200 can be executed by different processors on the same computer system or on different computer systems. Elements of the query result management system 200 can communicate with each other via one or more communications busses, network connectors, and/or intervening communication devices known to those of ordinary skill in the art.

The query result management system 200 can include a database query engine 202, a graph generator 204, a data field adjustment module 208, and a pop-up generator 214.

The database query engine 202 communicates with a database 210. The database 210 can be integrated with, and/or part of, the query result management system 200, for example, sharing the memory 104 with the query result management system 200. Alternatively, the database 210 can be separate from the query result management system 200, and in communication with the query result management system 200 via a network or other direct or indirect connection. The database 210 can include a data repository known to those of ordinary skill in the art, for example, a relational database. The database 210 can include one or more well-known repositories for storing user data, schemas containing metadata, and the like.

The database query engine 202 can perform a query of the database 210 to export data from the database 210 based on a set of user-defined search criteria. The database query engine 202 can communicate with a database browser, editor, wizard, export tool, and the like, to perform a query, which can include specifying filter criteria, fields, and other selection criteria related to the query, and/or view query results in a data base file, for example, a table. The database query engine 202 permits a user to interact with the result set, for example, via a display editor.

The graph generator 204 outputs the query results to a display, for example, a computer monitor or a touchscreen, as a graphical representation. In an embodiment, the graphical representation includes a field graph or other graph image that includes vertices and arcs extending between the vertices.

Figure 6:
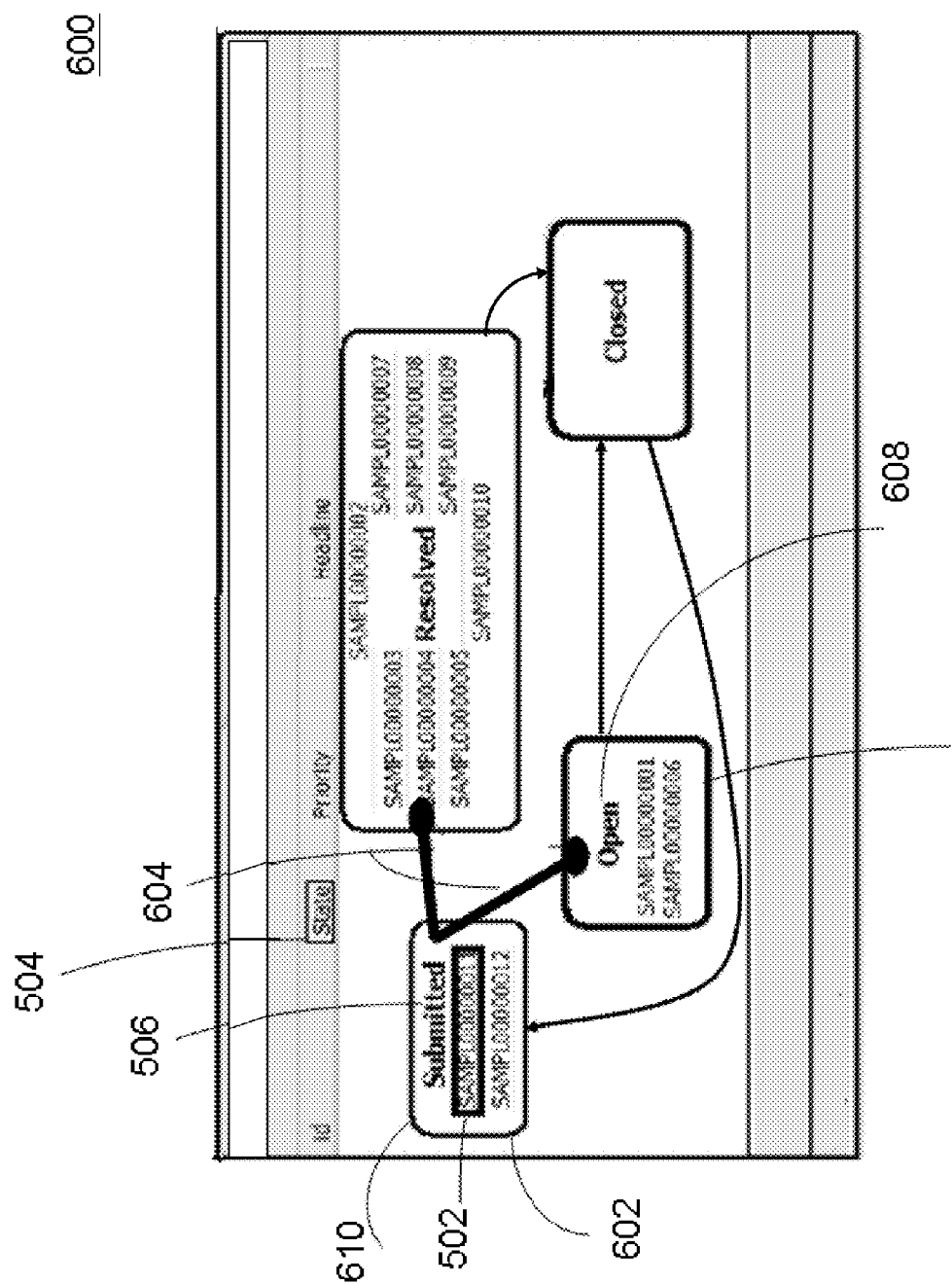
FIG. 6 is an illustration of the query results of FIG. 5 arranged in a field graph, in accordance with embodiment.

The graph generator 204 includes a vertices arrangement unit 206 that can display the records in the result set around a region proximal to the vertices of the generated graph, for example, as graphical icons. The graph generator 204 can arrange the vertices in a display area provided by the display 108, and correct or modify the positioning of the individual vertices in the arrangement when vertices are added or removed, for example, when record field values are added, removed, or changed, whereby corresponding vertices can likewise be added, removed, or changed. When the graphical representation changes, for example, by selecting a different field type, the graph generator 204 can produce a different graphical representation. The graph generator 204 can also display field values that correspond to the vertices. The graph generator 204 can display one or more records having a common field value in a region proximal to a vertex displaying the same field value. For example, as shown in FIG. 6, a vertex entitled "Resolved," can have a display window that includes a listing of records, e.g., SAMPL00000003, etc. having a Resolved field value.

The graph generator 204 includes an arc arrangement unit 212 that can generate one or more arcs that extend between vertices. An arc represents a possible transition between two vertices. The positioning of the arcs can be determined from relationships between record field values of a given field types. A different graphical representation of the same result set can be displayed, for example, by selecting a different field type. Here, the arc arrangement unit 212 can change the positioning of the arcs between vertices of the newly selected graphical representation. A record positioned at a vertex includes a field value corresponding to the vertex. Thus, when an arc is selected, for example, the record can be moved to a different vertex having a different field value. In an embodiment, a selected record at one end of the arc is changed to include the field value identified at the vertex at the other end of the arc. In another embodiment, a selected record proximal to a first vertex at one end of the arc is dragged and dropped into a dialog box, pop-up, and the like that is displayed at a region proximal to the second vertex at the other end of the arc, whereby the selected record is changed to include the field value identified at the second vertex.

Each record includes a set of possible transition paths. A selection of a record can therefore result in the set of possible transition paths being displayed as arcs, and transition paths being formed via the displayed arcs to destination vertices at the other end of the displayed arcs. When a user selects a record at a vertex, arcs are drawn or highlighted that represent the possible transition paths from the vertex to other vertices allowed on the graphical representation. For example, referring to FIG. 6, when a record identified as "SAMPL00000012" is selected, arcs can be displayed that show possible transition paths to vertices identified by "Resolved" and "Open" field values, respectively. In an embodiment, multiple records can be selected whereby an intersection of all sets for the selected records can be computed, and only those transition paths corresponding to the selected records are displayed. For example, if three records are selected, and possible transitions are displayed for only those three records. In another embodiment, the transition paths of all records, not just the selected records, can be displayed.

The data field adjustment module 208 can change a field value of a record to be populated with a field value identified at a vertex when the record is moved on a display to the vertex. The updated record can be displayed at a field graph or other graphical representation. For example, if a user selects that a database table be displayed instead of a field graph, the updated record can be displayed at the table having the newly added field value.

The pop-up generator 214 produces a dialog box, pop-up window, and the like, whereby a user can modify a result set by entering a new record field value. The pop-up window and the like can be located at a vertex. The new field value can be displayed at the vertex. A user can transition a record to the vertex, for example, a window for displaying records having the new field value, whereby the record is updated with the new field value. The arc arrangement unit 212 can display arcs that show possible transition paths from other vertices to the vertex having the new record field value.

Figure 3:
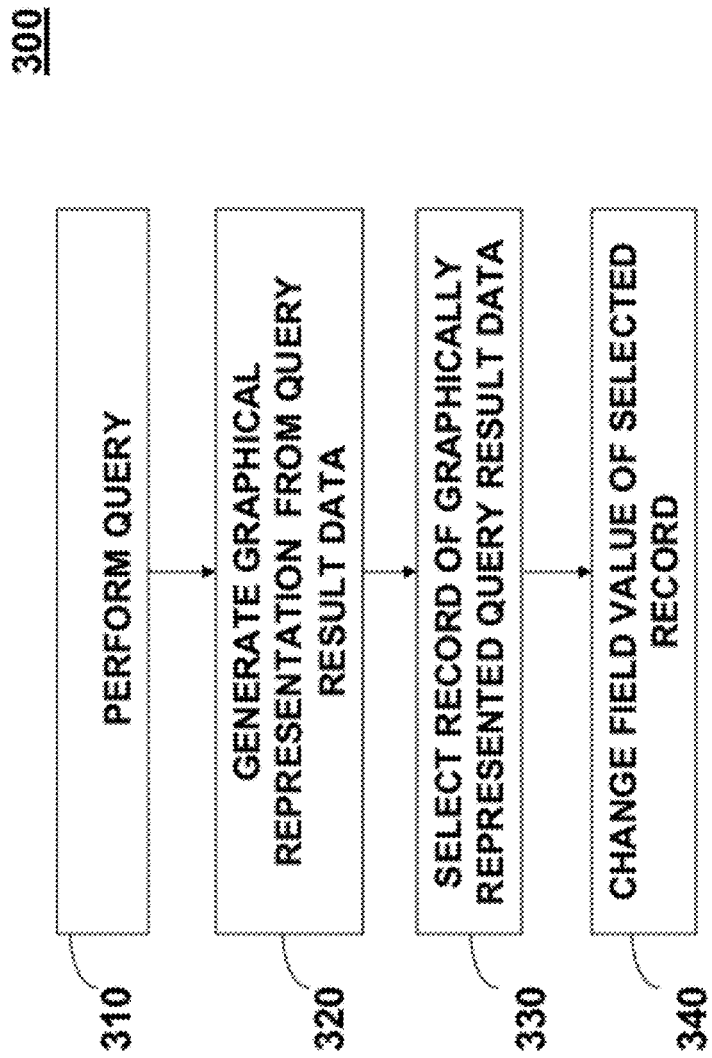
FIG. 3 is a flow diagram of a method for using a graphical representation of a query result set to modify query data, in accordance with an embodiment.

FIG. 3 is a flow diagram of a method 300 for using a graphical representation of a query result set to modify query data, in accordance with an embodiment. Some or all of the method 300 can be performed on an electronic device comprising at least a processor and memory, such as the computer system 100 described with reference to FIG. 1. The method 300 can make use of the query result management system 200 and/or a graphical user interface, a database query application, and/or other well-known computer applications.

According to the illustrated embodiment, a query is performed 310 to export or otherwise retrieve a result set from one or more storage repositories such as the database 210 shown in FIG. 2 according to user-defined selection criteria. The result set can be organized into a table or other well-known format, and can include data, for example, meta-information about column names or other query-related information. Each row of the result set can correspond to a database record, also referred to as a query result record. Each column of the result set can correspond to a record field type. The query result set can be displayed as a table or other well-known format on a computer display.

A field graph or other graphical representation can be generated 320 from the query result data. The graphical representation can be displayed by selecting a record field type from a result column, a field picker interface, or other user interface that displays a set of fields for selection by a user. The field graph includes a plurality of vertices. Each vertex can have at least one corresponding field value of the result set. The records collected from the query are visually presented at the vertices, according to a match between field values of the records and the field values corresponding to the vertices. The records can be arranged about the vertices of a field graph according to the field values. The records can be listed in the display window, dialog box, pop-up window, and the like at a corresponding vertex. The records can be added to or removed from the display window, dialog box, pop-up window, and the like by a mouse, keyboard, or other computer input device.

The field graph can also include a plurality of arcs that extend from the vertices to illustrate possible transition paths between records positioned in regions proximal to the vertices. The arcs can be displayed when the graphical representation is formed, or the arcs can be presented upon selection of a record having a field value to be changed.

One or more records can be selected 330 from the query result data. As described above, a field value can be displayed at a vertex of the field graph indicating that each record at the vertex includes the field value. One or more query result records at the vertex can be selected, for example, using a computer input device such as a mouse or keyboard. In an embodiment, arcs are displayed showing possible paths between records in the result set, and the records are shown as icons about vertices. For example, when the record is selected, the relevant arcs can be highlighted to show the possible paths to other vertices where the selected record can be transitioned.

A field value of the selected query result record can be changed 340 to a different field value by transitioning the selected query result record to a different vertex of the graphical representation. The user can determine a transition path for the selected record by selecting an arc extending from the selected record to the destination vertex. When the arc is selected, the record can be moved to a display box in a region proximal to the destination vertex. In another embodiment, the selected record is dragged and dropped into the region proximal to the destination vertex.

Figure 4:
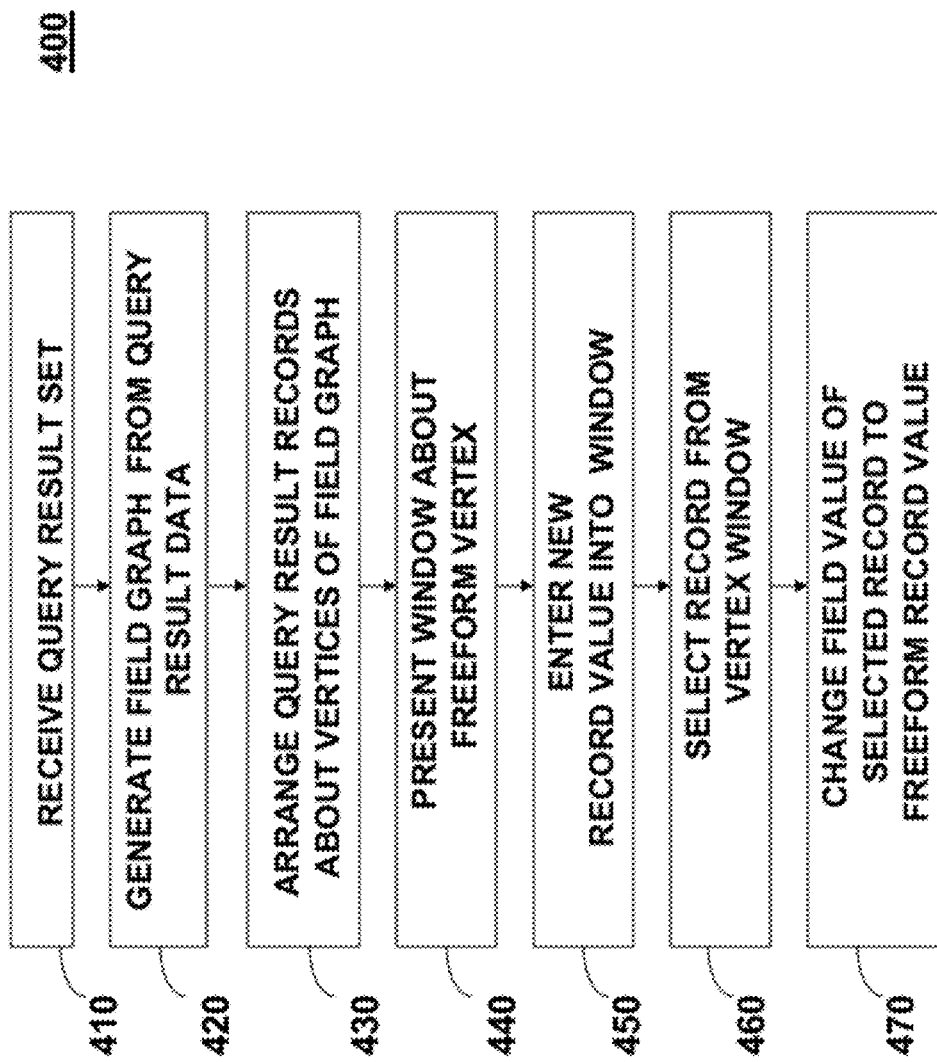
FIG. 4 is a flow diagram of a method for using a graphical representation of a query result set to modify query data, in accordance with another embodiment.

FIG. 4 is a flow diagram of a method 400 for using a graphical representation of a query result set to modify query data, in accordance with another embodiment. Some or all of the method 400 can be performed on an electronic device comprising at least a processor and memory, such as the computer system 100 described with reference to FIG. 1. The method 400 can make use of the query result management system 200, and/or a graphical user interface, a database query application, and/or other well-known computer applications.

According to the illustrated embodiment, a query result set is received 410, for example, by exporting a result set in response to a query from one or more storage repositories such as the database 210 shown in FIG. 2. A query can be performed to retrieve the query result set in a manner similar to that described in step 310 above, and will therefore not be repeated for reasons related to brevity.

A field graph or other graphical representation of the data identified from the query result set is generated 420 and displayed on a computer monitor, touchscreen, or other display known to those of ordinary skill in the art. The field graph includes a plurality of vertices. A different field value of the result set can correspond to each vertex. The field graph can be changed to a different graphical representation, for example, by selecting a different record field type at a graphical user interface, which can include different field values than those displayed at the previous graphical representation. Accordingly, the new graphical representation can include different vertices and/or arcs, and can be displayed with different record field values under the different record field type.

The query result records from the query result data can be arranged 430 about the vertices of the field graph. Each vertex can include a display window and the like that identifies a field value. A list of records can be displayed about the vertex, each of which includes the displayed field value.

The field graph can include at least one freeform vertex 440. A dialog box, pop-up form, blank field, and the like can be displayed at a region proximal to the freeform vertex for the user to enter 450 a field value. The field value can be a new field value that is added to the query result set. A new field value can be entered by typing it into the dialog box, or dragging the new field value from a list, table, and the like, and dropping it into a dialog box in a region proximal to the destination vertex. The freeform vertex 440 can be used as a catch-all or "other" category for displaying other record field values under a field type where there are too many field values to display. Transition arcs can extend to the freeform vertex from other vertices in the field graph. At least one record can be selected 460. The selected record can be transferred to the dialog box of the freeform vertex having the new field value by highlighting the arc between the source and destination vertices, or by a drag-and-drop operation, i.e. using an input device such as a mouse to drag the selected record from its original vertex into the freeform vertex. Accordingly, the record can be modified 470 to include the new field value displayed at the destination vertex.

Figure 5:
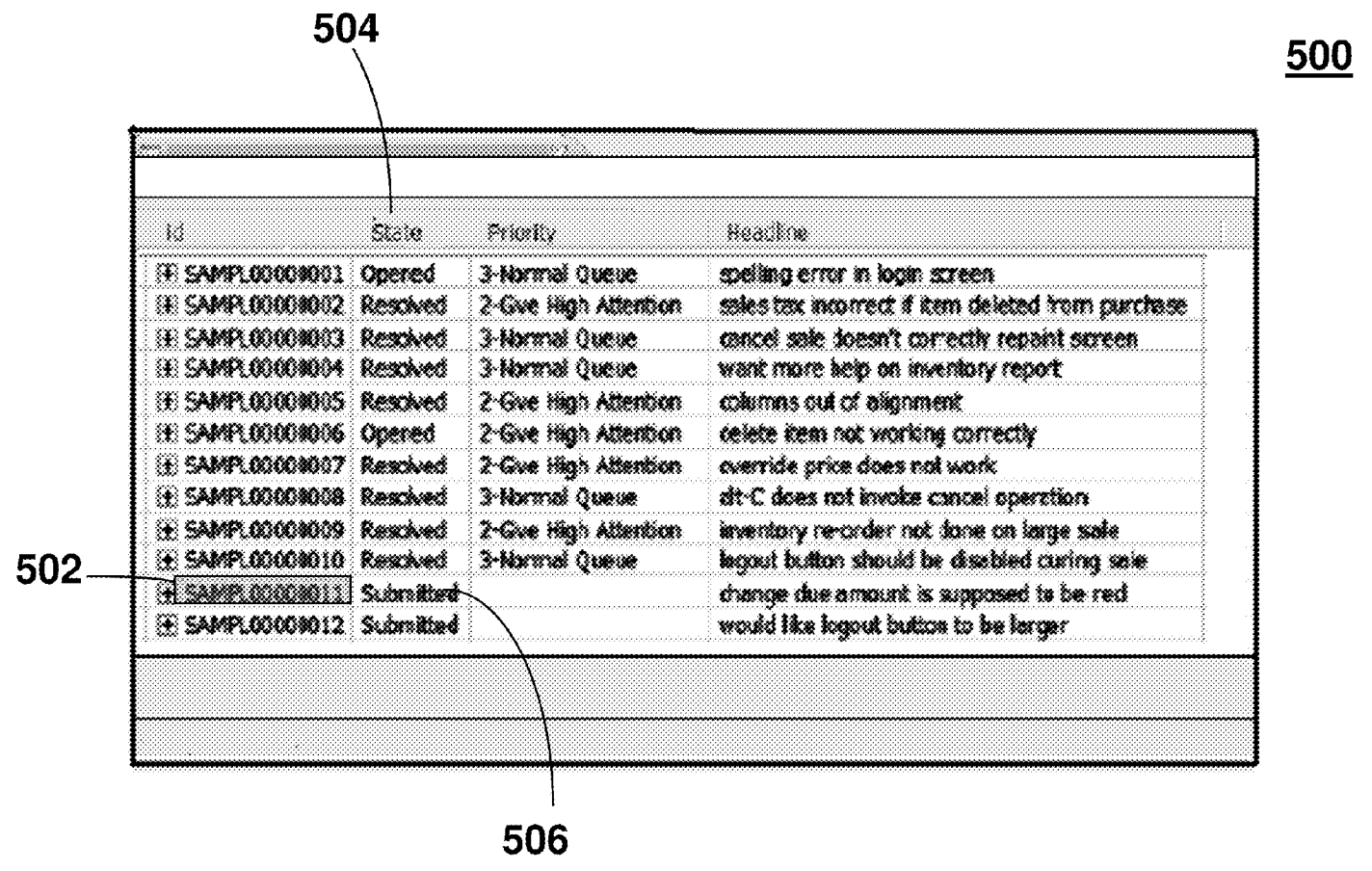

FIG. 5 is a screenshot of a query result set displayed at a database file 500, in accordance with an embodiment. The database file 500 can be displayed at one or more different formats by the query result management system 200 using a data visualization program such as a spreadsheet application, workflow automation application, change management application, and the like, for example, IBM® Rational® ClearQuest®. One format can include a table organized into rows and columns. Each row can correspond to a record, for example, record 502. Each column can correspond to a record field type, for example, a field type 504 entitled "State." Each record includes a plurality of fields, which can be populated with field values. For example, record 502 includes a field value 506 "Submitted" under the field type 504 entitled "State." The field values can be available for graphing, for example, presented in a field graph shown in FIG. 6. A user can select one or more rows and/or columns of the database file 500, and submit a request to generate a field graph from the contents of the selected contents to the query result management system 200, or a data visualization program in communication with the query result management system 200.

FIG. 6 shows the query results of FIG. 5 arranged in a field graph 600, in accordance with embodiment. The field graph 600 can be displayed using a data visualization program in communication with a graphical user interface, for example, an IBM® Rational® ClearQuest® application. The field graph 600 can be generated according to a field type selected by a user. For example, when the field type 504 entitled "State" is selected, the field graph 600 can display a status of a software bug (i.e., Submitted, Resolved, etc.). The state field values, i.e., Submitted, Resolved, etc., can be determined from a result column of a query result set. Accordingly, the field graph 600 can be displayed at a similar manner as a state diagram. For example, transition arrows 604 extend between vertices 602, 606 to indicate a possible transition between states, i.e. vertices, for a record located at the vertex 602. Each vertex corresponds to a record field value. Thus, the location of a record is determined by a match between a state field value of the record and the state identified at the vertex.

In one example, the Submitted record field value 506 is positioned at a vertex 602 of the field graph 600. In another example, the Open record field value 608 is positioned at a vertex 606. The record field values can be displayed at a window or box, for example, display window 610, proximal to the vertices. A listing of records having the field values can be listed in the window or box, for example, record 502.

When a record 502 entitled "SAMPL00000011" of the query results is selected, transition arrows 604 can be generated that indicate possible transitions to vertices having state field values Open and Resolved, respectively.

A user can change the state field value of the record 502 by selecting a highlighted arrow 604 or dragging the selected record 502 to the vertex 606. Accordingly, the state field value of the record 502 can be changed from "Submitted" to "Open," as shown in the field graph 700 of FIG. 7.

Figure 8:
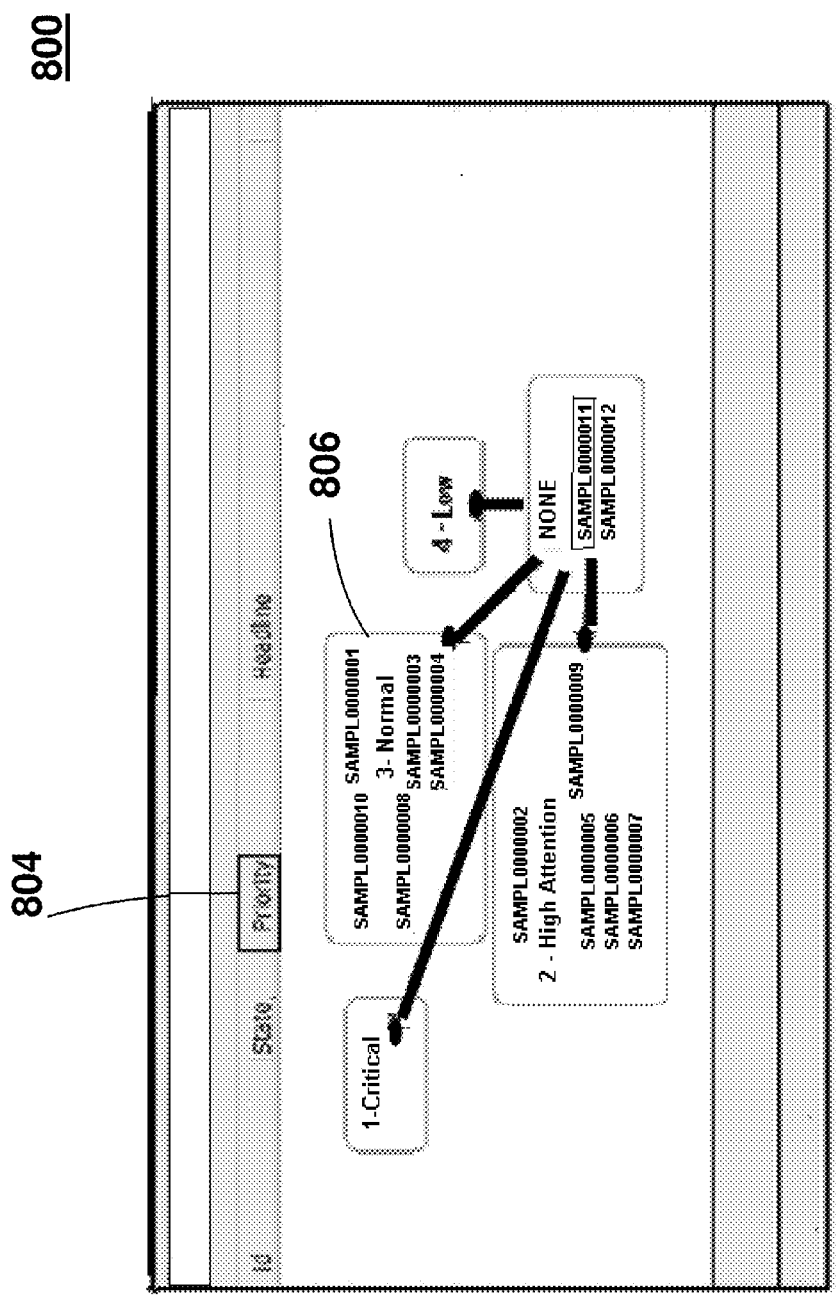
FIG. 8 is an illustration of the query results of FIG. 5 arranged in another field graph, in accordance with an embodiment.

FIG. 8 shows the query results of FIG. 5 arranged in a field graph 800, in accordance with another embodiment. The field graph 800 can be displayed using a data visualization program, for example, described herein.

Figure 7:
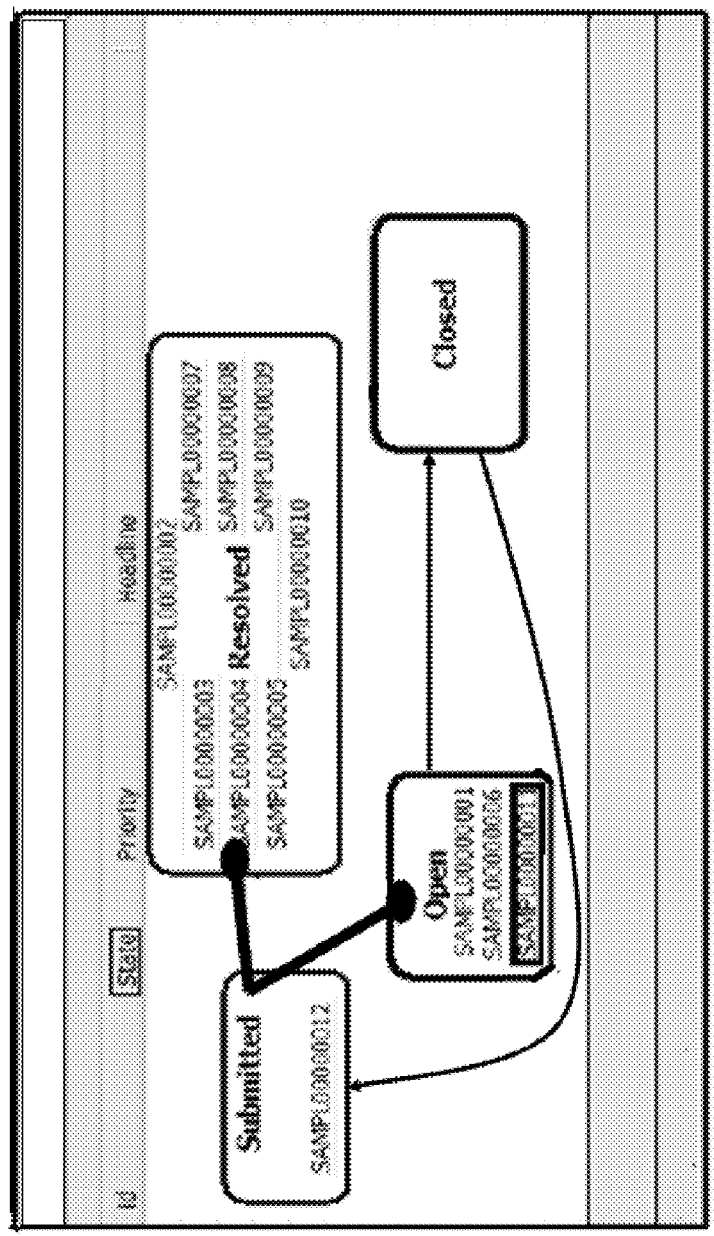
FIG. 7 is an illustration of a record field value change in the field graph of FIG. 6, in accordance with an embodiment.

Here, a different graphical representation of the query results of FIG. 5 is shown than the graphical representations of FIGS. 6 and 7. Namely, a field type 804 entitled "Priority" is selected instead of the field type 504 entitled "State" of the field graphs 600, 700 shown in FIGS. 6 and 7, respectively. By selecting different field types in this manner, users can easily switch between different representations of the same query results. Each graphical representation can display different field values, depending on the selected field type. For example, in FIG. 8, record 502 of the query results is shown having a record field value 806, i.e., "None", under the Priority field type.

Figure 9:
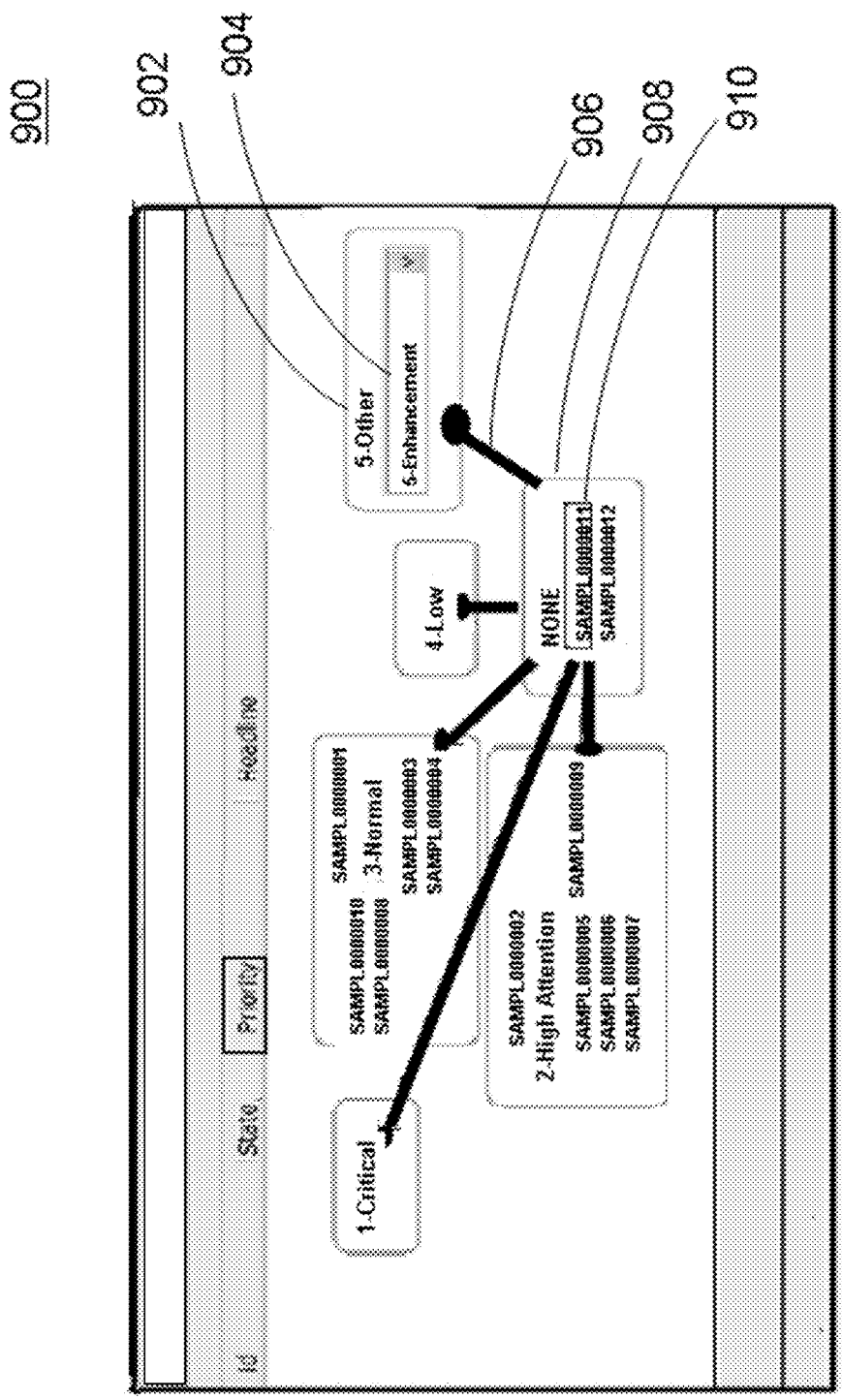
FIG. 9 is an illustration of the query results of FIG. 5 arranged in another field graph, in accordance with an embodiment.

FIG. 9 shows the query results of FIG. 5 arranged in a field graph 900, in accordance with another embodiment. The field graph 900 can be displayed at accordance with the method 400 described herein with reference to FIG. 4. The field graph 900 can be displayed using a data visualization program, for example, described herein.

The field graph 900 can include a pop-up window, dialog box, blank field, and the like for entering new field values. For example, a value 904 called "Enhancements" can be added to the "Other" dialog box 902, which is used as a catch-all field for entering new field values. Alternatively, the freeform vertex 440 can be used for displaying a list of records having field values that are not assigned to a vertex, for example, where there are too many field values under the displayed field type. Transition arcs 906 can extend to the freeform vertex from other vertices. For example, an arc 906 can extend from the dialog box 908 include a "None" field value. Records can be selected from the None dialog box 908, for example, record 910, and transferred to the dialog box 902 by selecting the arc 906 or a drag-and-drop operation. The Enhancements value 904 can be added under the Priority field type 804. The title of the dialog box 908 can be changed from "Other" to "Enhancements." A new "Other" dialog box can be generated at the field graph 900 to replace the dialog box 902 reconfigured for the Enhancements value, for example, by a user-selectable option in the user interface.

Figure 10:
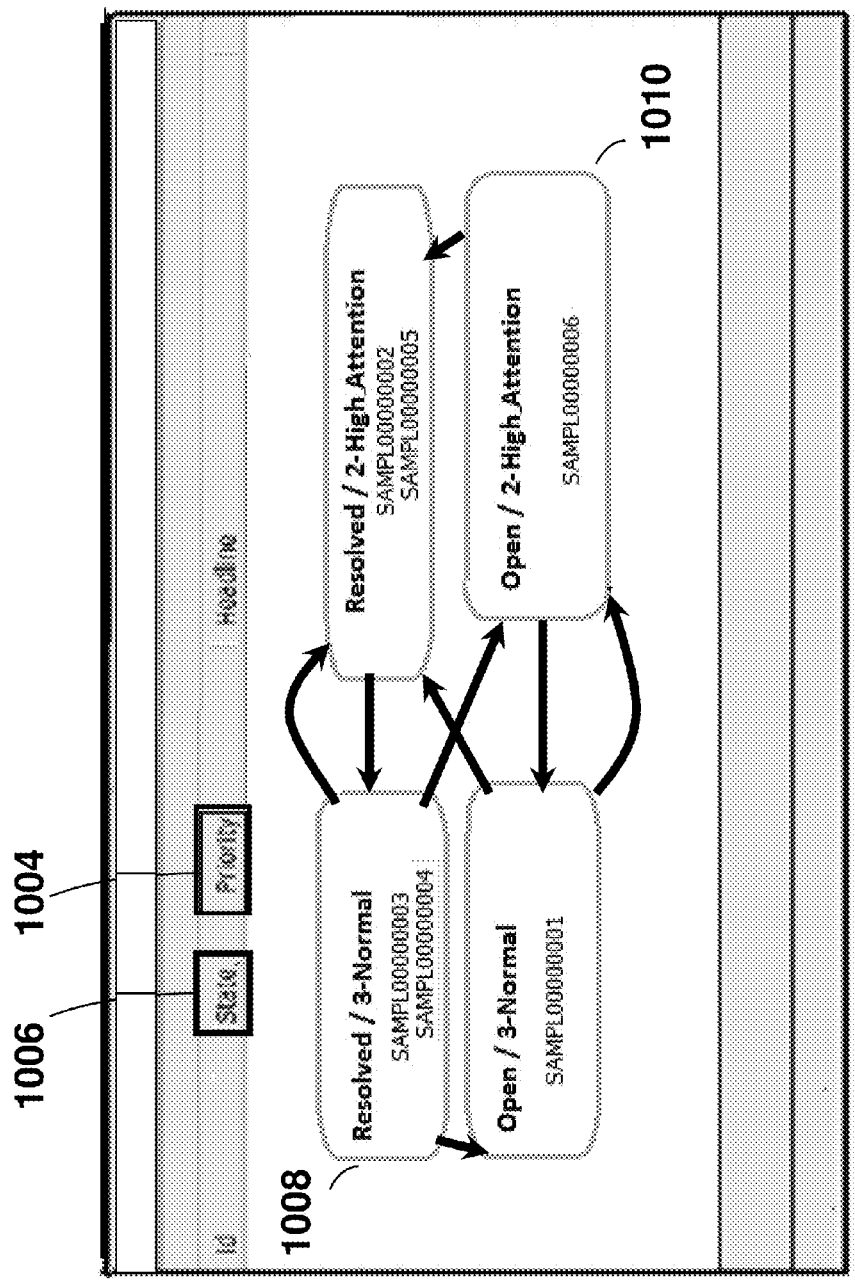
FIG. 10 is an illustration of the query results of FIG. 5 arranged in another field graph, in accordance with an embodiment.

FIG. 10 is an illustration of the query results of FIG. 5 arranged in another field graph, in accordance with an embodiment. In an embodiment, multiple field types are selected, which can correspond to multiple columns of the database file 500. For example, the Priority field type 1004 and the State field type 1006 can both be selected. A field graph can be generated that represents the field values of each field type by forming a product of the field values. For example, vertices can be generated that display "Resolved/Normal," 1008 "Open/High Attention," 1010, etc. The maximum number of displayed vertices can be predefined. A user can select combinations of certain field values to be displayed about vertices. The field graph can be configured such that a number of field values and/or a number of vertices do not exceed a predetermined number. A separate vertex can also be displayed, which includes the remaining field value combinations, for example, less relevant combinations. This vertex can be identified by a generic term such as "Others," instead of identifying the remaining field value combinations. Any records having such combinations can be located in a region proximal to this vertex.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer program product for changing query result data graphically displayed on an electronic device, the computer program product comprising:
a non-transitory computer readable storage medium having computer readable program code embodied therewith, the computer readable program code comprising;
computer readable program code configured to perform a query of a data repository;
computer readable program code configured to display a graphical representation of a set of query results identified from the query, the set of query results including a plurality of query result records, the graphical representation including a first location corresponding to a first record field value and a second location corresponding to a second record field value;
computer readable program code configured to display at the first location at least one query result record having the first record field value;
computer readable program code configured to select a query result record of the at least one query result record having the first record field value;
computer readable program code configured to change a field value of the selected query result record from the first record field value to the second record field value by transitioning the selected query result record to the second location of the graphical representation;
computer readable program code configured to display a plurality of field types;
computer readable program code configured to process at least two field types of the plurality of field types; and
computer readable program code configured to display a graphical representation of the query results, the graphical representation including a plurality of vertices, each vertex corresponding to a product of a field value of each of the at least two field types.

2. The computer program product of claim 1, wherein the graphical representation includes a field graph.

3. The computer program product of claim 1, further comprising computer readable program code configured to display a window at the second location, and wherein the second record field value is added to the selected query result record by positioning the selected query result record in the window.

4. The computer program product of claim 1, wherein a listing of records having the first record field value is displayed at the first location, and a listing of records having the second having the second record field value is displayed at the second location.

5. The computer program product of claim 1, wherein the first location includes a first node and the second location includes a second node, and wherein the computer readable program code configured to display the graphical representation of the set of query results identified from the query comprises program code configured to display an arc between the first node and the second node.

6. The computer program product of claim 5, wherein the field value of the selected query result record is changed from the first record field value to the second record field value by selecting the arc to transition the selected query result record from the first node to the second node.

7. The computer program product of claim 1, wherein the computer readable program code configured to change the field value of the selected query result record from the first record field value to the second record field value comprises:
computer readable program code configured to remove the selected query result record from the first location; and
computer readable program code configured to perform a drag-and-drop operation to transition the selected query result record to the second location.

8. The computer program product of claim 1, comprising:
computer readable program code configured to display a graphical user interface;
computer readable program code configured to select a first field type of the plurality of field types to display the graphical representation of the query results; and
computer readable program code configured to select a second field type of the plurality of field types to display a different graphical representation of the query results.

9. The computer program product of claim 8, wherein computer readable program code configured to select a second field type comprises:
computer readable program code configured to process a selected query result record of the plurality of query result records having a third record field value, the selected query result record displayed at a third location of the different graphical representation corresponding to the third record field value; and
computer readable program code configured to change a field value of a selected query result record from the third record field value to a fourth record field value by transitioning the selected query result record to a fourth location of the different graphical representation corresponding to the fourth record field value.

10. The computer program product of claim 1, wherein the second location includes a modifiable field, and wherein the computer readable program code configured to change the field value of the selected query result record comprises computer readable program code configured to provide the second record field value at the modifiable field.

11. The computer program product of claim 10, further comprising:
computer readable program code configured to present a dialog box at the second location;
computer readable program code configured to enter the second record field value in the dialog box.

12. The computer program product of claim 1, wherein the at least two field types are selected from columns of a database file, each column corresponding to a field type.

13. The computer program product of claim 1, wherein the at least two field types are selected at a graphical user interface displaying the field types.

* * * * *